United States Patent
Hayee et al.

(10) Patent No.: US 8,478,136 B2
(45) Date of Patent: Jul. 2, 2013

(54) ELECTRONIC COMPENSATION OF NONLINEARITY IN OPTICAL COMMUNICATION

(75) Inventors: M. Imran Hayee, Duluth, MN (US); Nisar Ahmed, Los Angeles, CA (US)

(73) Assignee: Eye Diagram2 IP, LLC, Fredericksburg, VA (US)

( * ) Notice: Subject to any disclaimer, the term of this patent is extended or adjusted under 35 U.S.C. 154(b) by 320 days.

(21) Appl. No.: 12/896,260

(22) Filed: Oct. 1, 2010

(65) Prior Publication Data

US 2012/0027412 A1 Feb. 2, 2012

Related U.S. Application Data

(60) Provisional application No. 61/248,071, filed on Oct. 2, 2009, provisional application No. 61/388,200, filed on Sep. 30, 2010.

(51) Int. Cl.
  *H04B 10/06* (2006.01)

(52) U.S. Cl.
  USPC .......................................... 398/208; 398/210

(58) Field of Classification Search
  USPC ................................. 398/208, 210
  See application file for complete search history.

(56) References Cited

U.S. PATENT DOCUMENTS

| | | | |
|---|---|---|---|
| 7,580,637 B2 * | 8/2009 | El-Ahmadi et al. | 398/135 |
| 8,014,686 B2 * | 9/2011 | Rahn et al. | 398/205 |
| 2009/0208224 A1 * | 8/2009 | Kikuchi | 398/141 |

OTHER PUBLICATIONS

R.J. Esiambre, et al.; "Inter-channel cross-phase modulation and four-wave mixing in high-speed TDM systems"; Electronics Letters, Sep. 2, 1999; pp. 1576-1578; vol. 35, No. 18.
R.I. Killey, et al.; "Reduction of Intrachannel Nonlinear Distortion in 40-Gb/s-Based WDM Transmission over Standard Fiber"; IEEE Photonics Technology Letters; Dec. 2000; pp. 1624-1626; vol. 12, No. 12.
Henning Bulow, et al.; "Electronic Dispersion Compensation"; IEEE/OSA Journal of Lightwave Technology; Jan. 2008; pp. 158-167; vol. 26, No. 1.
Jin Wang, et al.; "Performance of Electrical Equalizers in Optically Amplified OOK and DPSK Systems"; IEEE Photonics Technology Letters; May 2004; pp. 1399; vol. 16, No. 5.
V. Curri, et al.; "Electronic Equalization for Advanced Modulation Formats in Dispersion-Limited Systems"; IEEE Photonics Technology Letters; Nov. 2004; pp. 2556-2558; vol. 16, No. 11.
Kim Roberts, et al.; "Electronic Precompensation of Optical Nonlinearity"; IEEE Photonics Technology Letters; Jan. 15, 2006; pp. 403-405; vol. 18, No. 2.
Neal S. Bergano; "Undersea Communication Systems"; Tyco Telecommunications, Eatontown, NJ; Optical Fiber Telecommunications IVB Systems & Impairments; Chapter 4, vol. IVB; 2002; pp. 154-197; San Diego, CA.
A. H. Gnauck; "Advanced Amplitude-and Phase Coded Formats for 40-Gb/s Fiber Transmission" Lucent Technologies, Bell Laboratories; IEEE's 17th Annual Meeting of LEOS Technical Digest; 2004; pp. 605-606; vol. 2; Holmdel, NJ.

* cited by examiner

*Primary Examiner* — Shi K Li
(74) *Attorney, Agent, or Firm* — Potomac Patent Group, PLLC (57) ABSTRACT

In various embodiments, electronic apparatus, systems, and methods include electronic compensation of nonlinearity in optical communication. Additional apparatus, systems, and methods are disclosed.

26 Claims, 6 Drawing Sheets

ELECTRONIC COMPENSATION OF NONLINEARITY IN OPTICAL COMMUNICATION

RELATED APPLICATIONS

This application is related to, and claims priority from, U.S. Provisional Patent Application Ser. No. 61/248,071, entitled "Electronic Compensation of Nonlinearity in Optical Communication" to M. Imran Hayee and Nisar Ahmed, filed on Oct. 2, 2009, the disclosure of which is incorporated herein by reference. This application is also related to, and claims priority from, U.S. Provisional Patent Application Ser. No. 61/388,200, entitled "Electronic Post-Compensation of Fiber Nonlinearity for 40 Gb/s RZ-DPSK WDM Transmission Systems", to M. Imran Hayee and Nisar Ahmed, filed on Sep. 30, 2010, the disclosure of which is incorporated herein by reference.

BACKGROUND

A recent trend in wavelength division multiplexed (WDM) optical fiber systems and networks is to increase the per wavelength data rate to 40 Gb/s or higher. However, increasing data rate limits the maximum achievable distance because of degradation of signals caused by two fundamental physical phenomena i.e., fiber dispersion and fiber nonlinearity. In high speed WDM systems, interaction of fiber nonlinearity and dispersion manifests in many degrading effects limiting the total capacity as well as the achievable transmission distance. Fiber nonlinearity is a fundamental degrading effect in high speed WDM systems. With per channel data rate approaching to 40 Gb/s or higher in WDM systems, the degrading effects caused by fiber nonlinearity become mainly single channel effects e.g., self-phase modulation (SPM), intra-channel cross-phase modulation (IXPM), and intra-channel four-wave mixing (IFWM).

Many optical techniques to mitigate the effect of fiber nonlinearity have been proposed, though substantially most of the optical techniques do not compensate fiber nonlinearity but tend to mitigate or manage the effect of nonlinearity to begin with. The only exception is optical conjugation technique which tends to directly compensate optical nonlinearity by optical conjugation of the optical signal in the middle of the link and propagating the conjugated signal through the remaining half of the link which needs to be symmetric to the first half. In addition to optical techniques, many electronic techniques e.g., forward error correction (FEC) and digital signal processing (DSP) have been proposed for mitigating the dispersive and nonlinear degrading effects in WDM transmission systems. FEC technique inherently improves the transmission system performance by allowing the system to work at low signal-to-noise-ratio (SNR) and thereby mitigating the fiber nonlinearity. On the contrary, other DSP techniques tend to directly compensate the degradation caused by fiber dispersion and nonlinearity. Some of the recent DSP techniques have shown successful compensation (both pre and post compensation) of fiber dispersion alone, while some other techniques have shown successful pre-compensation of fiber nonlinearity. However, none of these techniques has successfully demonstrated the post-compensation of degrading effects already caused by fiber nonlinearity in spite of some attempts for simultaneous post compensation of fiber dispersion and nonlinearity.

The following publications provide additional information:

[1] R. J. Essiambre, B. Mikkelsen, and G. Raybon, "Intrachannel cross phase modulation and four wave mixing in high speed TDM systems", Electron. Lett., vol. 35, no. 18, pp. 1576-1578, 1999.

[2] R. I. Killey, H. J. Thiele, V. Mikhailov, and P. Bayvel, "Reduction of intrachannel nonlinear distortion in 40-Gb/s-based WDM transmission over standard fiber", IEEE Photon. Technol. Lett., vol. 12, pp. 1624-1626, 2000.

[3] H. Bulow, F. Buchali, and A. Klekamp, "Electronic Dispersion Compensation", IEEE/OSA JLT, vol. 26, pp. 158-167, January 2008.

[4] Jin Wang and Joseph M. Kahn, "Performance of electrical equalizers in optically amplified OOK and DPSK systems", IEEE Photon. Technol. Lett., vol. 16, pp. 1397-1399, May 2004.

[5] V. Curri, R. Gaudino, A. Napoli and P. Poggiolini, "Electronic equalization for advanced modulation formats in dispersion-limited systems", IEEE Photon. Technol. Lett., vol. 16, pp. 2556-2558, November 2004.

[6] Kim Roberts, Chuandong Li, L. Strawczynski, M. O'Sullivan, and I. Hardcastle, "Electronic Precompensation of Optical Nonlinieairity", IEEE Photon. Technol. Lett., vol. 18, pp. 403-405, January 2006.

[7] Neal S. Bergano, "Undersea communications systems", in Optical Fiber Telecommunication IVB Systems and Impairments, Ivan Kaminow and Tingye Li, Eds. San Diego, Calif.: Academic Press 2002, pp 154-197.

[8] A. H. Gnauck, "Advanced amplitude and pulsed coded formats for 40-Gb/s Fiber Transmission" in IEEE's 17th Annual Meeting of LEOS Technical Digest, 2004, vol. 2, pages 605-606.

All publications listed above are incorporated by reference in their entirety herein, as though individually incorporated by reference.

SUMMARY

According to exemplary embodiments, electronic post-compensating for fiber nonlinearity in wavelength division multiplex systems can be performed by, for example, processing an incoming bit by incorporating knowledge of neighboring bits to the incoming bit.

According to one exemplary embodiment, a method for electronically compensating for degrading effects to an optical signal resulting from fiber nonlinearity in optical transmission systems based on correlation of information from neighboring bits in a data stream, includes the steps of receiving a wavelength division multiplexed (WDM) optical data signal, separating each WDM channel by optical demultiplexing, converting each optical data signal into an electrical data signal, and electronically compensating for the degrading effects resulting from fiber nonlinearity based on correlation of information from neighboring bits in the electrical data signal.

According to another exemplary embodiment, an optical receiver includes a photodiode configured to receive a wavelength division multiplexed (WDM) optical data signal and to convert the demultiplexed WDM optical data signal into an electrical data signal, and a processor configured to electronically compensate for degrading effects resulting from fiber nonlinearity by adjusting an incoming bit in the electrical data signal using information from bits which neighbor the incoming bits in the electrical data signal.

BRIEF DESCRIPTION OF THE DRAWINGS

Embodiments of the invention are illustrated by way of example and not limited to the figures of the accompanying drawings in which:

FIGS. 2a-2d shows subsets of eye diagram for an example simulated transmission system, in accordance with various embodiments.

DETAILED DESCRIPTION

The following detailed description refers to the accompanying drawings that show, by way of illustration, details and embodiments in which the invention may be practiced. These embodiments are described in sufficient detail to enable those skilled in the art to practice embodiments of the invention. Other embodiments may be utilized and structural, logical, and electrical changes may be made without departing from the inventive subject matter. The various embodiments disclosed herein are not necessarily mutually exclusive, as some embodiments can be combined with one or more other embodiments to form new embodiments. The following detailed description is, therefore, not to be taken in a limiting sense.

In various embodiments, a novel electronic scheme can directly compensate the degrading effects resulting from fiber nonlinearity in 40 Gb/s or higher bit rate WDM transmission systems and can directly compensate single channel nonlinear effects in ≧40 Gb/s systems. Such an electronic technique or a digital signal processing (DSP) technique can compensate the degrading effect of fiber nonlinearity, a fundamental limiting factor, in high speed long-haul fiber optic communication systems. This novel technique can significantly improve system performance of high-speed long-haul WDM optical fiber communication systems and can help increase the capacity of the existing (already deployed) optical fiber systems as well as future generation optical fiber systems and networks. Examples of such long-haul optical fiber communication systems include systems having long-haul distances of 1000 km and 2000 km. The techniques and apparatus in various embodiments are not limited to these distances and may include systems having long-haul distances greater than 2000 km In addition to the compensation scheme not being limited to particular bit rates, the scheme is not limited to a modulation format or a group of modulation formats. Example modulation formats for the scheme include, but are not limited to, using return-to-zero (RZ) and carrier suppressed RZ (CSRZ) modulation formats in WDM transmission systems. Various embodiments include using computer simulations to analyze the system performance. For instance, the novel scheme, in example WDM transmission systems using return-to-zero (RZ) and carrier suppressed RZ (CSRZ) modulation formats, can significantly undo the degradation caused by fiber nonlinearity and can increase the overall system margin of a 40 Gb/s WDM system by >1.0 dB at a transmission distance of 1000 km.

Discussions herein include a principle of an embodiment of a compensation technique and an embodiment of recipe for determining time delays and decision thresholds of multiple decision circuits (DCs) used in the compensation technique. Discussions also describe a system model, transmission results, and discussion of operational results.

Due to large bandwidth, the energy of a given pulse carrying a data bit at ≧40 Gb/s transmission, spreads very quickly over a much wider time window and therefore interacts with many neighboring bits before the energy is pulled back in the proper bit-time slot via dispersion compensation. Due to dispersion mapping, this interaction can occur many times over the course of long-haul transmission and ultimately causes nonlinear pulse distortion. Such pulse distortion may be due to SPM, IXPM), and IFWM. Depending upon the channel power, modulation format, and the dispersion map, the bulk of the nonlinear degradation in a given pulse can manifest in terms of timing and/or amplitude jitter. The timing and/or amplitude shift in any given pulse depends upon the neighboring bits, with which that pulse interacts over the course of the transmission. In various embodiments, a technique can be implemented to compensate this timing and amplitude shift resulting from degrading nonlinear effects in a single channel by incorporating the knowledge of the neighboring bits and exploiting the fact that nonlinear degradation, deterministically, depends upon dispersion map and operating channel power.

Figure 1:
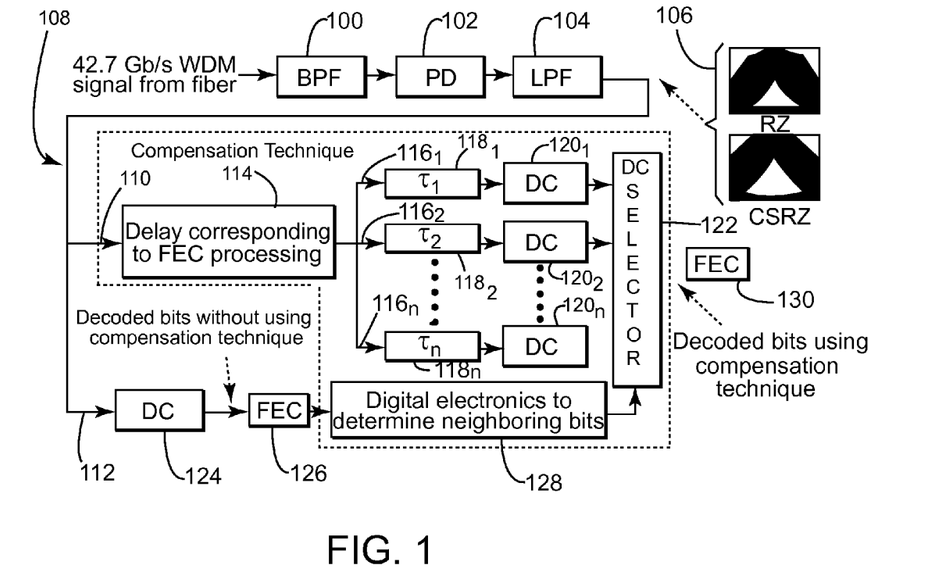
FIG. 1 shows a schematic block diagram delineating a working principle of a compensation technique, in accordance with various embodiments.

FIG. 1 shows a schematic block diagram delineating a working principle of an embodiment of a compensation technique. Therein, a received optical WDM signal is input to a bandpass filter (BPF) 100 for demutliplexing WDM optical data channels and then each optical data channel is converted from an optical signal into an electrical signal by photodiode (PD) 102. In some embodiments, a delay line interferometer may precede the PD 102. The electrical data signal is then low pass filtered (LPF) at block 104. Also shown in FIG. 1 are eye diagrams which are examplary 42.7 Gb/s simulated eyes for RZ and CSRZ modulation formats at transmission distance of 1000 km for average channel power of 3 dBm.

After low pass filtering the electrical signal is then passed on to an electronic or electrical compensation circuit or function generally referred to by reference numeral 108. The compensation function 108 includes an upper path 110 and a lower path 112. On the upper path 110, incoming bits are compensated to, e.g., adjust for the effects of fiber non-linearity. On the lower path 112, incoming bits are processed to provide information used to perform the compensation on the upper path 110 as will be described below.

If the incoming bits are to be compensated prior to removing forward error correction (FEC), as shown in FIG. 1, then a delay function 114 can be provided so that the upper path 110 and the lower path 112 operate synchronously. Alternatively, if the FEC is removed prior to the compensation being performed, then this delay block 114 could be omitted. Each incoming bit in the electrical data signal is then presented to a plurality of decision lines $116_1$, $116_2$ ... $116_n$. Each decision line 116 includes a delay element 118 and a decision circuit (DC) 120. Thus, the τ elements 118 are time delays of associated DCs 120 with respect to the center of the bit time. "DC selector" 122 can include a high speed electrical switch.

According to exemplary embodiments, the technique takes advantage of the FEC gain in estimating the neighboring bits and enhances the overall system margin above and beyond FEC gain. The scheme uses multiple DCs 120, each sampling the incoming bit at a different time (e.g., +/−5-20% of the bit time) within the bit-time slot at an optimized decision threshold. Depending upon the neighboring bits, as determined in the lower path 112, the output of only one decision circuit 120 is selected by selector 122. Thus, in the lower path 112, the incoming bit values are also determined, albeit without the compensation provided in the upper path 110, using a single DC 124 and then removing the FEC 126, wherein the bit values of the neighbor bits are then evaluated by 128 to drive the selection input to selector 122. The manner in which the values of one or more of the neighboring bits can be used to determine the selection input to selector 122 is described in more detail below. After compensation, an FEC decoding process can be performed on the compensated bits at block 130. The number of decision lines 116 can vary as a function of the number of neighboring bits whose information is used to make the selection. For example, if n neighboring bits on each side of an incoming bit are evaluated in block 128, then 2n+1 decision lines 116, and hence DCs 120, can be used.

The approximate time delay (τ) and decision threshold of each DC can be predetermined for each unique combination of the neighboring bits. However, both the time delay (τ) 118 and the decision threshold of each DC 120 can be further optimized the same way as is done in a traditional single DC case by monitoring the bit error rate (BER) while the system is operating. Each D.C. can be independently optimized without affecting the optimal settings of the other DCs using various embodiment of the compensation technique.

For RZ or CSRZ modulated systems, the approximate time delays and decision thresholds of multiple DCs used in an example technique can be estimated by determining the average time shift and average amplitude change in a given pulse for each unique combination of neighboring bits. The average time shift and amplitude change of a given pulse can be calculated by simulating a long pseudo random bit stream (PRBS) using the desired dispersion map and operating channel power. Each pulse in the received bit pattern undergoes a time shift as well as experiences an amplitude change in its peak value.

Figure 2A:
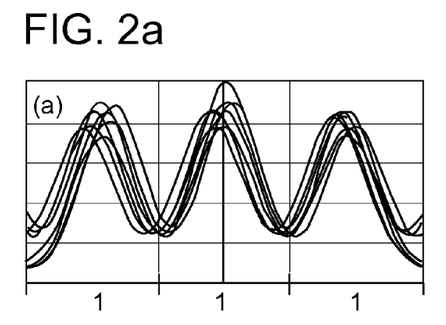
Figure 2B:
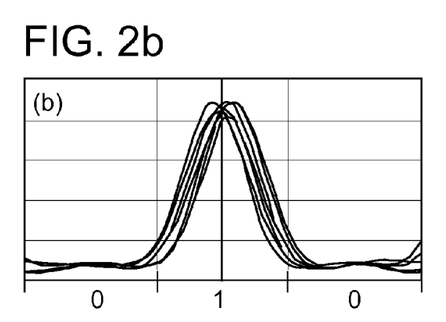
Figure 2D:
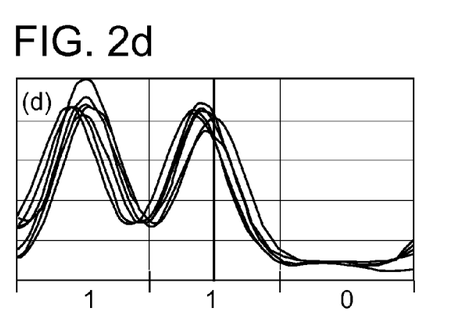

FIGS. 2a-2d show subsets of eye diagrams for an example simulated transmission system. The subsets of eye diagrams are illustrated with selective bits showing average time shift and amplitude change in "1" pulse with unique combinations of neighboring bits at the transmission distance of 1000 km. The time shift and amplitude change in a given pulse due to each unique combination of "one neighboring bit" on each side can be seen in FIGS. 2A-2D for an example simulated 40-Gb/s RZ transmission system. For this example system, if a pulse is neighbored by two "ones" or two "zeros", there is almost no average time shift in the pulse (FIGS. 2a and 2b). However, if the neighboring bits are different on each side, then there is a distinct average time shift (~2 ps) towards the direction of "one" bit (FIGS. 2c and 2d). These four average time shift values (i.e., 0, 0, +2, and −2 ps) correspond to the 4 mutually exclusive combinations of "one neighboring bit" on each side (i.e., 0x0, 1x1, 0x1, and 1x0), and therefore, can be used as the time delay values for the 4 DCs in implementing an embodiment of a compensation technique. More generally, as mentioned above, various time shift values of between about plus or minus 5 and 20% of a bit period can be determined for a particular system and used in delay elements 116.

As far as the decision threshold(s) used in DCs 120 are concerned, the average amplitude change is similar for all combinations of one neighboring bit on each side, shown in FIGS. 2a-2d, for this example system suggesting that the decision threshold of all DCs will be similar. With n neighboring bits on each side, a maximum of $2^{2n}$ DCs can be used. However, some of the DCs turn out to have the same time delays and decision thresholds due to symmetric patterns. For example, in the above case, two symmetric combinations of one neighboring bit on each side i.e., 0x0 and 1x1 use the same time delay and decision threshold. Therefore, only 3 DCs are actually needed instead of 4.

Simulations of 42.7 Gb/s (40 Gb/s data rate+7% FEC overhead) RZ and CSRZ modulated WDM system on two different dispersion maps each consisting of 100 km fiber spans followed by a two stage erbium-doped fiber amplifier (EDFA) (noise figure=6 dB) were performed. In first dispersion map each fiber span consisted of 80 km of dispersion shifted fiber (DSF) with D=−4.5 ps/nm-km and $A_{eff}$=50 µm², followed by 20 km of standard single mode fiber (SSMF) with dispersion (D) D=18 ps/nm-km and $A_{eff}$=80 µm². In the second dispersion map, each span consisted of 100 km of transmission SSMF followed by 20 km of lumped dispersion compensating fiber (DCF) with D=−90 ps/nm-km, $A_{eff}$=25 µm². The path average dispersion for both dispersion maps was −0.1 ps/nm-km. Each channel carrying 4096 PRBS was modulated with RZ or CSRZ modulation format (extinction ratio=12 dB) before optical multiplexing. The propagation of multiplexed WDM signal was simulated using the split step Fourier scheme. The total calculated amplifier noise was added at the receiver before the photo-detector (PD) to calculate an average bit error rate (BER) using the BER of each bit separately. The average BER was then converted to a Q value to evaluate the system performance.

Figure 3A:
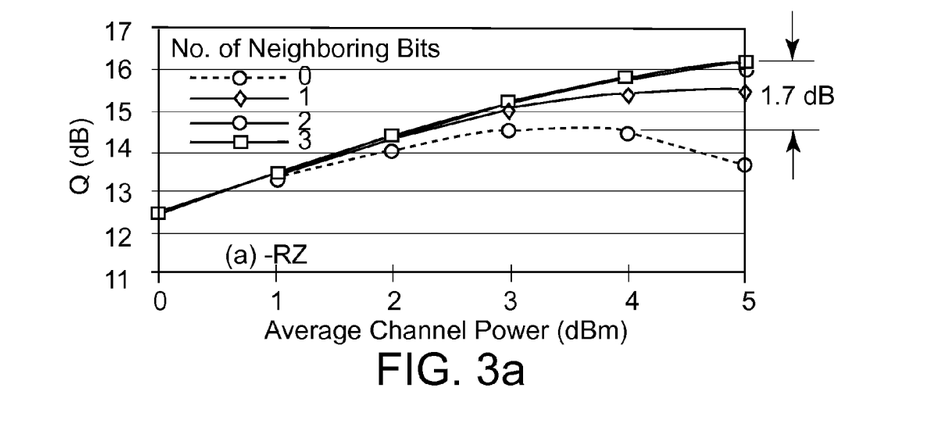
FIGS. 3a and 3b show Q vs. average channel power for an example 42.7 Gb/s WDM transmission system, in accordance with various embodiments.
Figure 3B:
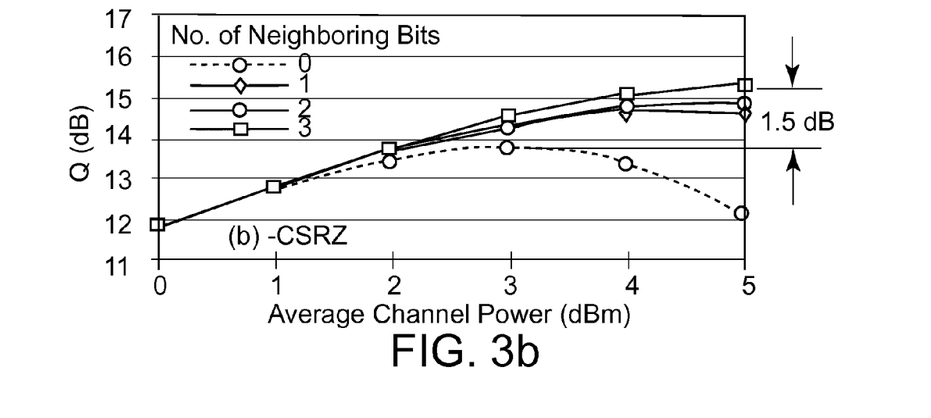

FIGS. 3a and 3b show Q vs. average channel power for an example 42.7 Gb/s WDM transmission system after 1000 km transmission distance for (a) RZ and (b) CSRZ modulation formats. The three curves with solid lines are for using an embodiment of a compensation technique with 1, 2, and 3 neighboring bits on each side. The dispersion map is DSF+SSMF. First, in the testing, both RZ and CSRZ modulation formats with 200 GHz channel spacing for 1000 km of transmission distance on DSF+SSMF dispersion map were simulated by varying the average channel power. The Q value of the middle of 5 simulated WDM channels using a conventional single receiver was calculated. The resulting Q values vs. average channel power are shown in FIGS. 3a and 3b, respectively for RZ and CSRZ modulation formats. Then, a receiver with multiple DCs, in accordance with an embodiment for compensation, was simulated by using the neighboring bits as a guide to which DC should be chosen for the final decision for a given bit. The Q values were re-calculated using the compensation technique with 4, 16, and 64 DCs for 1, 2, and 3 neighboring bits, respectively, on each side. The resulting Q values are plotted in FIGS. 3a and 3b, respectively for RZ and CSRZ modulation formats, showing that an embodiment of the compensation technique can increase the overall system margin by more than 1.5 dB using 3 neighboring bits on each side for both RZ and CSRZ modulation formats. From the testing, it was also noticed that the majority of the gain using the compensation technique comes from 4 DC case using only one neighboring bit on each side. This is because the nonlinear interaction in this dispersion map is more significant in the beginning of the fiber span when the power is high. The fiber dispersion (−4.5 ps/nm-km) and loss (0.25 dB/km) values at the beginning of the span are such that the pulses can only strongly interact with their first immediate neighbors during the first 10-15 km of transmission in each span when optical pulse power is strong enough. With the Q values recalculated using only $2n+1$ DCs instead of $2^{2n}$ DCs, where n is the number of neighboring bits on each side, it was noticed that $2n+1$ DCs are sufficient to obtain comparable results as shown in FIG. 3a-3b.

Figure 4:
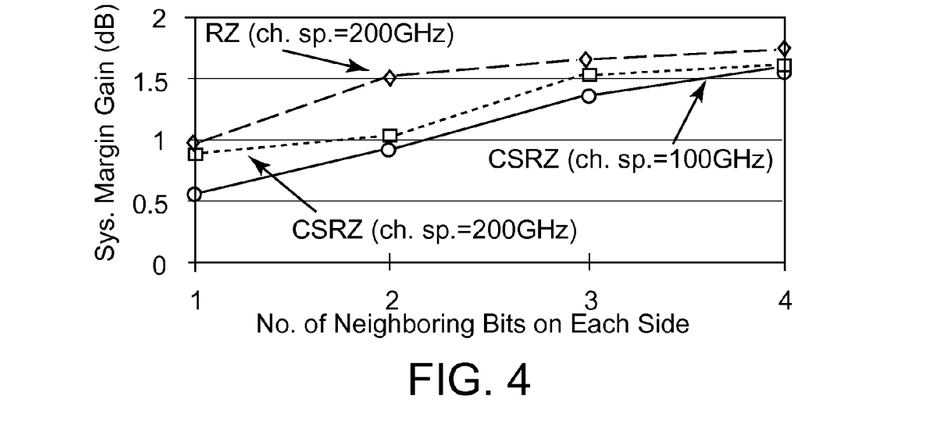
FIG. 4 shows system margin gain vs. number of neighboring bits on each side for example systems, in accordance with various embodiments.

FIG. 4 shows system margin gain vs. number of neighboring bits on each side for 200-GHz RZ and CSRZ, and 100-GHz CSRZ systems at a transmission distance of 1000 km. The dispersion map is DSF+SSMF. In FIG. 4, system margin improvement versus number of neighboring bits on each side using only $2n+1$ DCs is plotted, which shows that ~1.5 dB system margin is achievable with 3 neighboring bits on each side for both RZ and CSRZ modulation formats with 200 GHz channel spacing. FIG. 4 also shows results from repeating the WDM simulations for CSRZ with 100 GHz channel spacing. Typically, RZ with 100 GHz channel spacing may not be possible due to linear crosstalk resulting from large bandwidth. Although, the optimal system Q value was decreased by ~2.0 dB in 100 GHz CSRZ system (not shown) as compared to 200 GHz CSRZ system because of increased cross-phase modulation at lower channel spacing, the resulting system margin improvement was still similar to that of 200 GHz system using 2 or more neighboring bits on each side with only a handful of DCs as shown in FIG. 4. This shows that the intra-channel degradation caused by fiber nonlinearity is comparable in both 100 and 200 GHz WDM systems.

Figure 5:
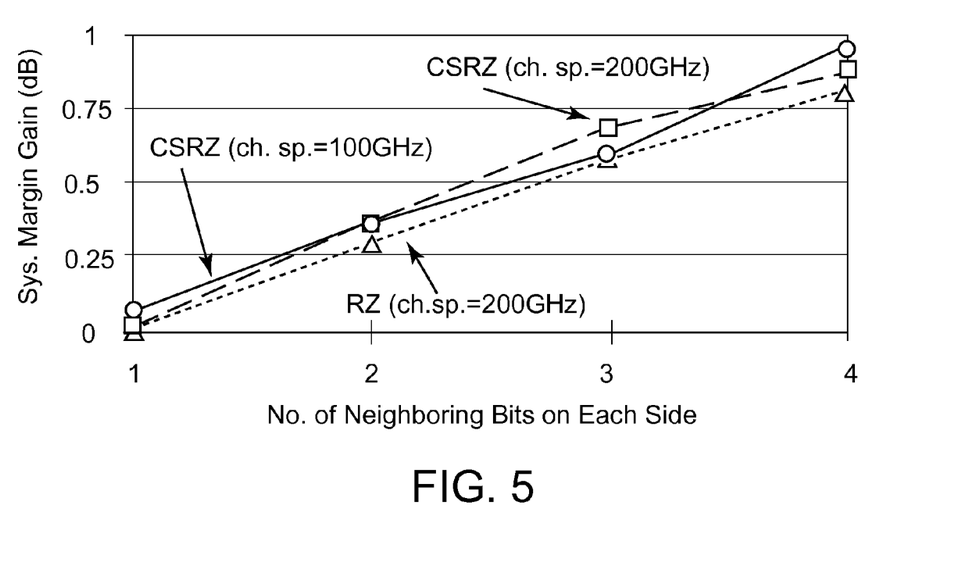
FIG. 5 shows system margin gain vs. number of neighboring bits on each side for example systems, in accordance with various embodiments.

FIG. 5 shows system margin gain vs. number of neighboring bits on each side for 200-GHz RZ and CSRZ, and 100-GHz CSRZ systems at transmission distance of 1000 km. The dispersion map is SSMF+DCF. The results in FIG. 5 are from repeated WDM simulations corresponding to FIG. 4 except that these simulations are for a SSMF+DCF dispersion map rather than the DSF+SSMF dispersion map associated with FIG. 4. The three systems –200 GHz RZ, 200 GHz CSRZ and 100 GHz CSRZ systems were simulated with the achieved system margin improvement for all three systems shown in FIG. 5. It an be noticed that the system margin improvement increases linearly with number of neighboring bits for all simulated systems as opposed to saturation effect which was observed in DSF+SSMF dispersion map. The reason for this is that because of the strong dispersion map, the bits spread very quickly and interact with many neighboring bits in the beginning of the fiber when channel power is high. Therefore, many neighboring bits may be needed to be included for this dispersion map to obtain a reasonable system margin improvement using the example compensation technique. As shown in FIG. 5, more than 4 neighboring bits are used for this dispersion map to obtain ~1 dB system margin improvement, using the compensation technique.

In various embodiments, a novel scheme can be implemented electronically post-compensating fiber nonlinearity in $\geq 40$ Gb/s WDM transmission systems by incorporating the knowledge of the neighboring bits to compensate the amplitude and timing jitter caused by the nonlinear interaction of neighboring bits. Example transmission systems for such a compensation scheme, include, but are not limited to, an example 42.7 Gb/s WDM transmission system using both RZ and CSRZ modulation formats. Depending upon the dispersion map used, the compensation technique can effectively enhance the overall system margin by more than 1.0 dB in both RZ and CSRZ WDM transmission systems.

Different modulation formats can be used in the systems and processes that implement electronic compensation for fiber nonlinearity, in accordance with various embodiments. The following is a discussion related to example tests using such compensation techniques in both return-to-zero (RZ) and differential phase shift keying (DPSK) WDM transmission systems. The analysis of the associated the system performance was conducted using computer simulations. The analysis showed that the compensation scheme can significantly undo the degradation caused by fiber nonlinearity and can increase the overall system margin of a 40 Gb/s WDM system by 1.5 and 1.0 dB, respectively, for RZ and RZ-DPSK modulation formats for long-haul transmission distance. Such long-haul transmission distance can include a long-haul distance of 1000 km.

Figure 6:
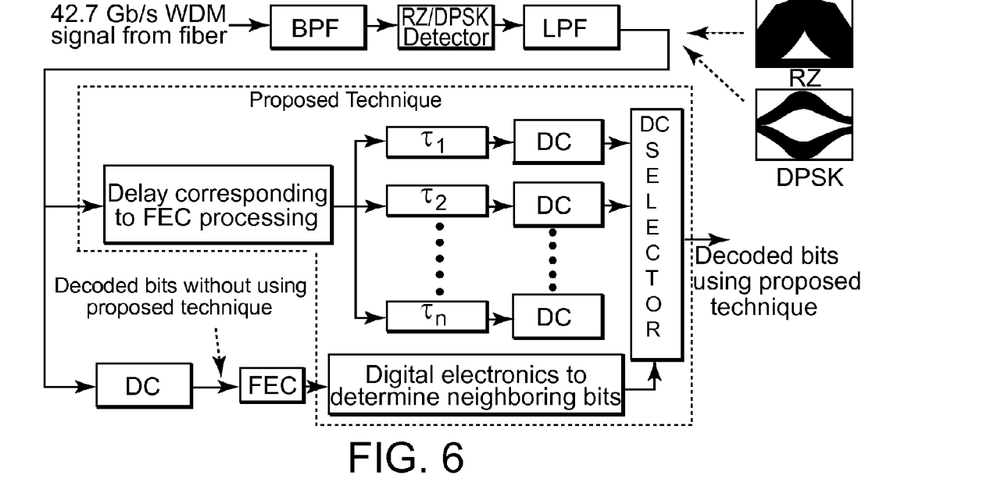
FIG. 6 shows a block diagram of a compensation technique with eye diagrams at the receiver for both a RZ modulation format and a DPSK modulation format, in accordance with various embodiments.

FIG. 6 shows a block diagram of a compensation technique with eye diagrams at the receiver for both a RZ modulation format and a DPSK modulation format. The eye diagrams are the 42.7 Gb/s simulated eyes for RZ (transmission distance=1000 km) and DPSK (transmission distance=2000 km) modulation formats for average channel power for 4 dBm.

In DPSK systems, information is encoded in the relative phase change for the two consecutive pulses, therefore, each pulse representing "one" or "zero" bit is neighbored by similar pulses on each side suggesting the average time shift in a given pulse is expected to be almost zero regardless of its neighboring bits. That implies that multiple DCs in the compensation technique for the DPSK system will have similar time delays. However, because the nature of the detection is different in the DPSK system, the distinct combination of neighboring bits can manifest in distinct decision thresholds. To estimate these distinct decision thresholds, a typical DPSK received signal after Mach-Zehnder delay interferometer (MZDI) (eye diagram shown as one of the insets in FIG. 6) can be split into selective bit patterns based upon 4 unique combinations of neighboring bits i.e., 0x0, 0x1, 1x0 and 1x1.

Figure 7:
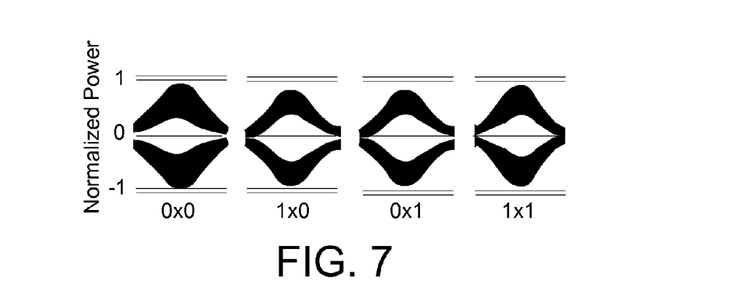
FIG. 7 shows four subsets of the eye diagram for selective bit patterns for DPSK system at the transmission distance of 2000 km, in accordance with various embodiments.
Figure 8:
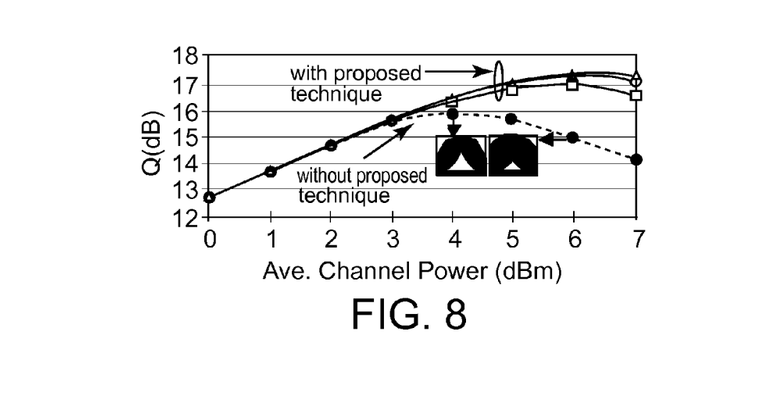
FIG. 8 shows the Q vs. average channel power for a single channel 42.7 Gb/s RZ system at a transmission distance of 1000 km, in accordance with various embodiments.

FIG. 7 shows four subsets of the eye diagram for selective bit patterns for DPSK system at the transmission distance of 2000 km. Two unique combinations, i.e., 0x0 and 1x1 produce asymmetrical eye diagrams suggesting that the optimal decision thresholds for these patterns can be moved in the opposite direction. On the contrary, 0x1 and 1x0 combinations produce symmetrical eyes suggesting that the decision thresholds can be close to zero for these combinations. This can be explained by noticing that 0x0 or 1x1 combinations of bits will affect the middle bit differently depending upon "1" or "0" as the middle bit. For example, 000 or 111 have no phase change relative to the middle bit on each side but 010 or 101 will have a phase change on either side with respect to the middle bit. The asymmetrical phase change in 0x0 or 1x1 patterns manifests as asymmetrical eyes. Similarly, 1x0 or 0x1 will have a phase change on only one side of the middle bit for either "1" or "0" as the middle bit producing symmetrical eyes as shown in FIG. 8. Therefore, in the DPSK system, the three different DCs with distinct decision thresholds can be used for the three unique combinations of one neighboring bit on each side, i.e., 0x0, 0x1/1x0, and 1x1.

Testing of the use of RZ and RZ-DPSK modulation formats included simulations of a single channel 42.7 Gb/s (7% FEC overhead) transmission system on a dispersion map consisting of 100 km fiber spans followed by an EDFA (noise figure=6 dB) to compensate the total span loss (22 dB). Each fiber span consisted of 80 km of dispersion shifted fiber (D=−4.5 ps/nm-km, $A_{\it eff}$=50 μm$^2$) followed by 20 km of standard single mode fiber (D=18 ps/nm-km, $A_{\it eff}$=80 μm$^2$). The path average dispersion was −0.1 ps/nm-km. Each channel carrying 4096 PRBS-bits was modulated with RZ (extinction ratio=12 dB) or RZ-DPSK modulation format before optical multiplexing. The propagation of multiplexed WDM signal was simulated using the split step Fourier scheme. The total calculated amplifier noise was added at the receiver before the photo-detector (PD) or MZDI in the case of RZ and RZ-DPSK systems, respectively, to calculate an average bit error rate (BER) using the BER of each bit separately. The average BER was then converted to a Q value to evaluate the system performance.

The single channel 42.7 Gb/s RZ transmission system for 1000 km of transmission distance was simulated first by varying the average channel power and the Q value was calculated using the conventional receiver. The resulting Q is shown in FIG. 8 vs. average channel power (solid circles with dotted line). FIG. 8 shows the Q vs. average channel power for single channel 42.7 Gb/s RZ system at a transmission distance of 1000 km. The three curves with solid lines are for using the compensation technique with 3, 5, and 7 DCs. The curve shows the expected performance trend i.e., more nonlinear degradation with increased channel power. The simulated pulse train data before the conventional receiver without adding noise can be analyzed and the average time shifts and amplitude changes in a given pulse for every unique combination of 1, 2 and 3 neighboring bits on each side for the optimal channel power can be calculated. Then, 3, 5, and 7 DCs with pre-calculated time delays and decision thresholds were used. For increased channel power, the time delays were increased further to accommodate enhanced time shifts resulting from stronger nonlinear interaction with neighboring bits. The Q values were recalculated using the compensation technique with 3, 5, and 7 DCs, respectively, taking advantage of mutually exclusive combinations of 1, 2, and 3 neighboring bits on each side. The resulting Q values, shown in FIG. 8, suggest that overall system margin can be increased by 1.5 dB using the compensation technique. It was also noticed that the majority of the gain using the compensation technique comes from the 3 DC case using only one neighboring bit on each side. This is because the nonlinear interaction in this dispersion map is more significant in the beginning of the fiber span when the power is high. The fiber dispersion and loss values at the beginning of the span are −4.5 ps/nm-km and 0.22 dB/km, respectively. Therefore, significant interaction between pulses can only occur with their immediate neighbors during the first 10-15 km of transmission when optical pulse power is strong.

Figure 9:
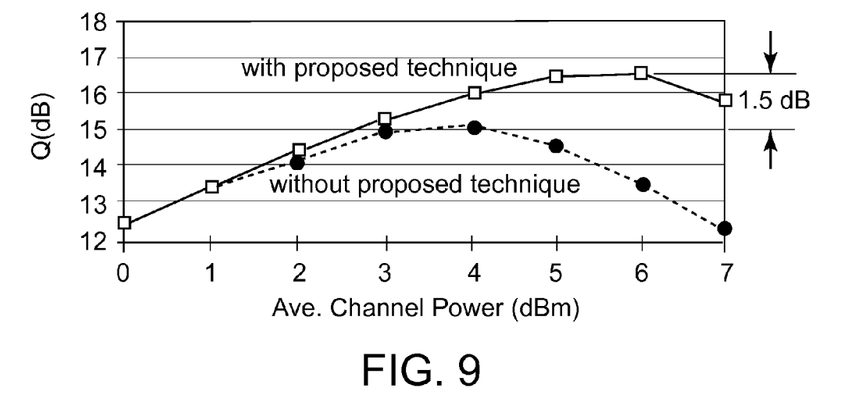
FIG. 9 shows the Q of a selected middle channel vs. average channel power for 42.7 Gb/s WDM RZ system at a transmission distance of 1000 km, in accordance with various embodiments.

FIG. 9 shows the Q of a selected middle channel vs. average channel power for 42.7 Gb/s WDM RZ system at a transmission distance of 1000 km. The WDM transmission system with 200 GHz channel spacing for the same transmission distance was simulated and the resulting Q values of the middle channel vs. average channel power are shown in FIG. 9 with and without the compensation technique (7 DC case). The overall gain in WDM system margin using the compensation technique is almost 1.5 dB, very comparable to that of the single channel system showing effectiveness of the compensation technique for high speed WDM transmission systems. This is because the majority of the degradation in high speed WDM system comes from single channel nonlinear effects.

Figure 10:
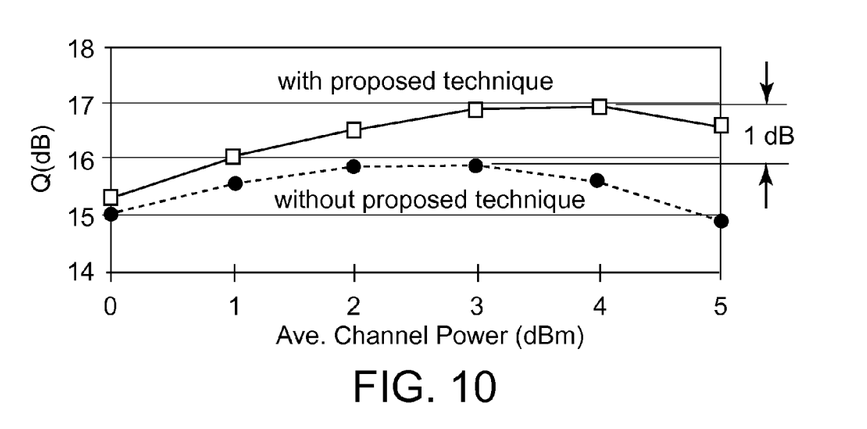
FIG. 10 shows the Q of a selected middle channel vs. average channel power for 42.7 Gb/s WDM DPSK system at a transmission distance of 2000 km, in accordance with various embodiments.

FIG. 10 shows the Q of a selected middle channel vs. average channel power for 42.7 Gb/s WDM DPSK system at a transmission distance of 2000 km. The 42.7 Gb/s single channel and WDM simulations for the DPSK system with and without the compensation technique for the transmission distance of 2000 km were conducted in a manner repeating the process used for the WDM RZ system of FIG. 9. The resulting Q values for the WDM case are plotted vs. average channel power in FIG. 10, showing that almost 1 dB system margin can be obtained using the compensation technique for DPSK system. Three DCs were used for this WDM DPSK system and the optimal decision thresholds for each of the DCs were calculated. The performance of the single channel DPSK system (not shown) was very comparable to that of the WDM case.

In these tests, it was demonstrated that a novel compensation scheme, according to various embodiments, can be implemented to electronically compensate fiber nonlinearity in ≧40 Gb/s WDM transmission systems by incorporating the knowledge of the neighboring bits. Various modulation formats can be used. For instance, such a compensation scheme implemented with respect to an example 42.7 Gb/s WDM transmission system using both RZ and DPSK modulation formats can effectively enhance the overall system margin up to 1.5 dB by compensating the amplitude and timing jitter caused by the nonlinear interaction of neighboring bits in both DPSK and RZ WDM transmission systems.

Although specific embodiments have been illustrated and described herein, it will be appreciated by those of ordinary skill in the art that any arrangement that is calculated to achieve the same purpose may be substituted for the specific embodiments shown. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A method for electronically compensating for degrading effects to an optical signal resulting from fiber nonlinearity in optical transmission systems based on correlation of information from neighboring bits in a data stream, the method comprising:

receiving a wavelength division multiplexed (WDM) optical data signal;

converting said WDM optical data signal into an electrical data signal; and electronically compensating for said degrading effects resulting from fiber nonlinearity by sampling each incoming bit in said electrical data signal a plurality of different times to generate a plurality of time-shifted samples of said incoming bit;

determining, for each of said plurality of time-shifted samples of said incoming bit, a bit value associated for a respective time-shifted sample of said incoming bit; and selecting one of said bit values associated with one of said respective time-shifted samples of said incoming bit using information associated with at least one neighbor bit of said incoming bit.

2. The method of claim 1, wherein said step of electronically compensating further comprises: shifting at least one of an amplitude and a timing of an incoming bit in said electrical data signal based on information associated with at least one neighboring bit proximate to said incoming bit in said electrical data signal.

3. The method of claim 2, wherein said at least one of an amplitude and a timing by which said incoming bit is shifted has a predetermined value.

4. The method of claim 2, wherein said at least one neighboring bit is located on each side of said incoming bit, wherein said incoming bit is adjacent to at least two neighboring bits, and wherein said step of shifting further comprises:
shifting said incoming bit in time by a predetermined time shift value prior to deciding a bit value of said incoming bit, said predetermined time shift value selected based on bit values of said at least two neighboring bits.

5. The method of claim 4, wherein said predetermined time shift value is plus or minus 5-20% of a bit period.

6. The method of claim 4, wherein said predetermined time shift value is zero if said at least two neighboring bits each have a same bit value, said predetermined time shift value is +2 ps if said at least two neighboring bits have a value of zero and one, and said predetermined time shift value is −2 ps if said at least two neighboring bits have a value of one and zero.

7. The method of claim 1, wherein said step of determining further comprises: using a different decision threshold for each of said plurality of time-shifted samples to determine a respective bit value.

8. The method of claim 1, wherein said information associated with at least one neighbor bit of said incoming bit is a bit value of n bits preceding and following said incoming bit in said electrical data signal, where n can be one or more.

9. The method of claim 8, wherein said bit value of said n bits preceding and following said incoming bit is determined using a single decision circuit in parallel to said electronic compensating of said incoming bit.

10. The method of claim 1, wherein said WDM optical signal is modulated using one of RZ, CSRZ, DPSK, and RZ-DPSK modulation formats.

11. The method of claim 1, further comprising the step of: removing forward error correction from said electrical data signal after said electronically compensating step.

12. An optical receiver comprising:
a photodiode configured to receive a wavelength division multiplexed (WDM) optical data signal and to convert said WDM optical data signal into an electrical data signal; and
a processor configured to electronically compensate for degrading effects resulting from fiber nonlinearity by sampling each incoming bit in said electrical data signal a plurality of different times to generate a plurality of time-shifted samples of said incoming bit, by determining, for each of said plurality of time-shifted samples of said incoming bit, a bit value associated for a respective time-shifted sample of said incoming bit, and by selecting one of said bit values associated with one of said respective time-shifted samples of said incoming bit using information associated with at least one neighbor bit of said incoming bit.

13. The optical receiver of claim 12, wherein said processor is configured to electronically compensate said incoming bit by shifting at least one of an amplitude and a timing of an incoming bit in said electrical data signal based on information associated with at least one neighboring bit proximate to said incoming bit in said electrical data signal.

14. The optical receiver of claim 13, wherein said at least one of an amplitude and a timing by which said incoming bit is shifted has a predetermined value.

15. The optical receiver of claim 13, wherein said at least one neighboring bit is located on each side of said incoming bit, wherein said incoming bit is adjacent to at least two neighboring bits, and wherein said processor is further configured to shift said incoming bit in time by a predetermined time shift value prior to deciding a bit value of said incoming bit, said predetermined time shift value selected based on bit values of said at least two neighboring bits.

16. The optical receiver of claim 15, wherein said predetermined time shift value is zero if said at least two neighboring bits each have a same bit value, said predetermined time shift value is +2 ps if said at least two neighboring bits have a value of zero and one, and said predetermined time shift value is −2 ps if said at least two neighboring bits have a value of one and zero.

17. The optical receiver of claim 15, wherein said predetermined time shift value is plus or minus 5-20% of a bit period.

18. The optical receiver of claim 12, wherein said processor is configured to perform said determining by using a different decision threshold for each of said plurality of time-shifted samples to determine a respective bit value.

19. The optical receiver of claim 12, wherein said information associated with at least one neighbor bit of said incoming bit is a bit value of n bits preceding and n bits following said incoming bit in said electrical data signal, where n can be one or more.

20. The optical receiver of claim 19, wherein said bit value of said n bits preceding and following said incoming bit is determined using a single decision circuit in parallel to said electronic compensating of said incoming bit.

21. The optical receiver of claim 19, further comprising: 2n+1 decision lines, each decision line including a delay element and a decision circuit.

22. The optical receiver of claim 12, wherein said WDM optical signal is modulated using one of RZ, CSRZ, DPSK, and RZ-DPSK modulation formats.

23. The optical receiver of claim 12, wherein said processor is further configured to remove forward error correction from said electrical data signal after said electronically compensating step.

24. The optical receiver of claim 12, further comprising: a delay line interferometer disposed upstream of said photodiode.

25. A method comprising: electronically post-compensating fiber nonlinearity in wavelength division multiplex systems including processing an incoming bit by incorporating knowledge of neighboring bits to the incoming bit, by sampling each incoming bit in said electrical data signal a plurality of different times to generate a plurality of time-shifted samples of said incoming bit, by determining, for each of said plurality of time-shifted samples of said incoming bit, a bit value associated for a respective time-shifted sample of said incoming bit, and by selecting one of said bit values associated with one of said respective time-shifted samples of said incoming bit using information associated with at least one neighbor bit of said incoming bit.

26. An apparatus comprising: circuitry to electronically post-compensate fiber nonlinearity in wavelength division multiplex systems such that an incoming bit is processed by incorporating knowledge of neighboring bits to the incoming bit, by sampling each incoming bit in said electrical data signal a plurality of different times to generate a plurality of time-shifted samples of said incoming bit, by determining, for each of said plurality of time-shifted samples of said incoming bit, a bit value associated for a respective time-shifted sample of said incoming bit, and by selecting one of said bit values associated with one of said respective time-shifted samples of said incoming bit using information associated with at least one neighbor bit of said incoming bit.

* * * * *